US012548526B2

(12) United States Patent
Kim et al.

(10) Patent No.: US 12,548,526 B2
(45) Date of Patent: Feb. 10, 2026

(54) DISPLAY DEVICE

(71) Applicant: LG Display Co., Ltd., Seoul (KR)

(72) Inventors: Minhoi Kim, Paju-si (KR); Taegung Kim, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 18/967,113

(22) Filed: Dec. 3, 2024

(65) Prior Publication Data

US 2025/0279072 A1 Sep. 4, 2025

(30) Foreign Application Priority Data

Feb. 29, 2024 (KR) ........................ 10-2024-0029520

(51) Int. Cl.
*G09G 3/3291* (2016.01)

(52) U.S. Cl.
CPC ....... *G09G 3/3291* (2013.01); *G09G 2310/08* (2013.01); *G09G 2320/0233* (2013.01); *G09G 2320/0276* (2013.01)

(58) Field of Classification Search
None
See application file for complete search history.

(56) References Cited

U.S. PATENT DOCUMENTS 10,235,922 B2 * 3/2019 Hu ........................ G09G 3/2007
12,027,093 B2 * 7/2024 Chu ...................... G06F 3/1446
2007/0200804 A1 * 8/2007 Kwon .................. G09G 3/3291 345/76
2010/0073335 A1 * 3/2010 Min ..................... G09G 3/3233 345/204
2010/0188320 A1 * 7/2010 Min ..................... G09G 3/3291 345/80
2013/0162617 A1 * 6/2013 Yoon .................... G09G 3/3291 345/76
2014/0176622 A1 * 6/2014 Jung .................... G09G 3/3233 345/76
2014/0184670 A1 * 7/2014 Jeong ................... G09G 3/3225 345/694
2015/0145852 A1 * 5/2015 Ahn ..................... G09G 3/3677 345/99
2016/0232852 A1 * 8/2016 An ....................... G09G 3/3291
2017/0090617 A1 * 3/2017 Jang .................. G06F 3/041662
2017/0090673 A1 * 3/2017 Kim ...................... G06F 3/0418
2017/0169796 A1 * 6/2017 Tai ....................... G09G 3/3233
2018/0182278 A1 * 6/2018 Kim ..................... G09G 3/3266
2018/0211581 A1 * 7/2018 Hu ........................... G09G 3/20
2019/0147831 A1 * 5/2019 Lee .......................... G09G 3/20 345/691
2020/0020278 A1 * 1/2020 Lee ...................... G09G 3/3275
2020/0160781 A1 * 5/2020 Park ..................... G09G 3/3275
2020/0335045 A1 * 10/2020 Jeong .................. G09G 3/3233
2022/0137774 A1 * 5/2022 Park ...................... G06F 3/0443 345/174
2022/0216265 A1 * 7/2022 Liu ...................... H10H 29/142
2022/0415264 A1 * 12/2022 Lee ..................... G09G 3/3291

* cited by examiner

*Primary Examiner* — Sepehr Azari
(74) *Attorney, Agent, or Firm* — Fenwick & West LLP

(57) ABSTRACT

The present disclosure relates to a display device, and more specifically, to a display device in which the formation of a boundary line caused by a luminance difference in an output image can be prevented by controlling image data output from a timing controller to a data driver or gamma reference voltages output from a gamma driver to the data driver based on data voltages output from the data driver.

14 Claims, 11 Drawing Sheets

FIG. 7A

| Flag | Header | ADC data | | | |
|---|---|---|---|---|---|
| 10b | 111000 | SL01 | SL02 | ··· | SI0240 |

FIG. 7B

| Flag | Header | ADC data | | | |
|---|---|---|---|---|---|
| 10b | 111000 | Vdata1 | Vdata2 | ··· | Vdata960 |

| BR1_2 | | | | | | | | | | BR2_1 | | | | | | | | | |
|---|---|---|---|---|---|---|---|---|---|---|---|---|---|---|---|---|---|---|---|
| SDIC01 | | | | | | | | | | SDIC02 | | | | | | | | | |
| DL1_951 | DL1_952 | DL1_953 | DL1_954 | DL1_955 | DL1_956 | DL1_957 | DL1_958 | DL1_959 | DL1_960 | DL2_1 | DL2_2 | DL2_3 | DL2_4 | DL2_5 | DL2_6 | DL2_7 | DL2_8 | DL2_9 | DL2_10 |
| Vdata 951 | Vdata 952 | Vdata 953 | Vdata 954 | Vdata 955 | Vdata 956 | Vdata 957 | Vdata 958 | Vdata 959 | Vdata 960 | Vdata 1 | Vdata 2 | Vdata 3 | Vdata 4 | Vdata 5 | Vdata 6 | Vdata 7 | Vdata 8 | Vdata 9 | Vdata 10 |
| 2V | 2V | 2V | 2V | 2V | 2V | 2V | 2V | 2V | 2V | 3V | 3V | 3V | 3V | 3V | 3V | 3V | 3V | 3V | 3V |

FIG. 12

| | | | | | | | | | | | | | | | | | | | | | | | | |
|---|---|---|---|---|---|---|---|---|---|---|---|---|---|---|---|---|---|---|---|---|---|---|---|---|
| | | BB1_2 | | | | | | | | | | | BB2_1 | | | | | | | | | | | |
| SDATAU1_comp | | | | | | | | | | | | | SDATAU2_comp | | | | | | | | | | | |
| ... | 950 | 951 | 952 | 953 | 954 | 955 | 956 | 957 | 958 | 959 | 960 | 1 | 2 | 3 | 4 | 5 | 6 | 7 | 8 | 9 | 10 | 11 | ... |
| ... | D950 +0 | D951 +a1 | D952 +a2 | D953 +a3 | D954 +a4 | D955 +a5 | D956 +a6 | D957 +a7 | D958 +a8 | D959 +a9 | D960 +a10 | D1-b1 | D2-b2 | D3-b3 | D4-b4 | D5-b5 | D6-b6 | D7-b7 | D8-b8 | D9-b9 | D10-b10 | D11-0 | ... |

FIG. 13

| | | | | | | | | | | | | | | | | | | | |
|---|---|---|---|---|---|---|---|---|---|---|---|---|---|---|---|---|---|---|---|
| BB1_2 | | | | | | | | | | BB2_1 | | | | | | | | | |
| SDIC1 | | | | | | | | | | SDIC2 | | | | | | | | | |
| DL1_951 | DL1_952 | DL1_953 | DL1_954 | DL1_955 | DL1_956 | DL1_957 | DL1_958 | DL1_959 | DL1_960 | DL2_1 | DL2_2 | DL2_3 | DL2_4 | DL2_5 | DL2_6 | DL2_7 | DL2_8 | DL2_9 | DL2_10 |
| Vdata951 | Vdata952 | Vdata953 | Vdata954 | Vdata955 | Vdata956 | Vdata957 | Vdata958 | Vdata959 | Vdata960 | Vdata1 | Vdata2 | Vdata3 | Vdata4 | Vdata5 | Vdata6 | Vdata7 | Vdata8 | Vdata9 | Vdata10 |
| 2V | 2.05V | 2.1V | 2.15V | 2.2V | 2.25V | 2.3V | 2.35V | 2.4V | 2.45V | 2.5V | 2.55V | 2.6V | 2.65V | 2.7V | 2.75V | 2.8V | 2.85V | 2.9V | 3V |

| BR1_2 | | | | | | | | | | BR2_1 | | | | | | | | | |
|---|---|---|---|---|---|---|---|---|---|---|---|---|---|---|---|---|---|---|---|
| SDIC01 | | | | | | | | | | SDIC02 | | | | | | | | | |
| DL1_951 | DL1_952 | DL1_953 | DL1_954 | DL1_955 | DL1_956 | DL1_957 | DL1_958 | DL1_959 | DL1_960 | DL2_1 | DL2_2 | DL2_3 | DL2_4 | DL2_5 | DL2_6 | DL2_7 | DL2_8 | DL2_9 | DL2_10 |
| Vdata 951 | Vdata 952 | Vdata 953 | Vdata 954 | Vdata 955 | Vdata 956 | Vdata 957 | Vdata 958 | Vdata 959 | Vdata 960 | Vdata 1 | Vdata 2 | Vdata 3 | Vdata 4 | Vdata 5 | Vdata 6 | Vdata 7 | Vdata 8 | Vdata 9 | Vdata 10 |
| 2.5V | 2.5V | 1.5V | 2.5V | 2.5V | 1.5V | 2.5V | 2.5V | 1.5V | 2.5V | 2.5V | 1.5V | 2.5V | 2.5V | 1.5V | 2.5V | 1.5V | 2.5V | 2.5V | 1.5V |

DISPLAY DEVICE

CROSS REFERENCE TO RELATED APPLICATION

The present application claims priority to Republic of Korea Patent Application No. 10-2024-0029520, filed Feb. 29, 2024, which is hereby incorporated by reference in its entirety.

BACKGROUND

Field of Technology

The present disclosure relates to a display device.

Description of the Related Art

Recently, as the information age enters, a display field in which electrical information signals are visually expressed has developed rapidly, and in response thereto, various display devices having excellent performance, such as thinness, lightness, and low power consumption, are being developed.

Examples of display devices may include a liquid crystal display (LCD) device, an organic light emitting diode (OLED) display device, a quantum dot display device, etc.

In such a display device, a data driver generates gamma voltages based on gamma reference voltages supplied by a gamma driver, converts digital video data into analog data voltage based on the gamma voltages, and supplies the data to data lines of a display panel to control the luminance of output images.

Meanwhile, the data driver may include a plurality of data driving integrated circuits, distances between driving integrated circuits and the gamma drivers may be different for each data driving integrated circuit, and there may be a difference between the gamma reference voltages applied to each data driving integrated circuit. Therefore, since a luminance difference occurs between driving regions of the display panel allocated to different data driving integrated circuits, a boundary line between the driving regions in the output image may be visible.

SUMMARY

The present disclosure is directed to achieving the necessity and/or solving the problems that are described above.

The present disclosure is directed to providing a display device in which the formation of a boundary line caused by a luminance difference in an output image can be prevented by controlling image data output from a timing controller to a data driver or gamma reference voltages output from a gamma driver to the data driver based on data voltages output from the data driver.

The present disclosure is also directed to providing a display device in which the manufacturing cost can be reduced with a simple structure by sensing the data voltage output from the data driver using data transmission lines for sensing changes in characteristic values of a driving transistor of a sub-pixel and an analog-to-digital converter.

The object of the present disclosure is not limited to the above-described objects, and other objects that are not mentioned will be able to be clearly understood by those skilled in the art from the following description.

A display device according to one embodiment includes a display panel, a plurality of data driving integrated circuits configured to apply data voltages to a plurality of data lines disposed on the display panel, a timing controller configured to output image data to the plurality of data driving integrated circuits, and a gamma driver configured to output gamma reference voltages to the plurality of data driving circuits, wherein the data driver includes a data voltage output circuit configured to output the data voltage to the data line, a feedback transmission line having one side connected to the data line, a sensing line disposed on the display panel, an analog-to-digital converter connected to the other side of the feedback transmission line and configured to convert the data voltage transmitted through the feedback transmission line into a digital signal and output the digital signal to the timing controller, a bus low voltage differential signaling (BLVDS) line disposed between the analog-to-digital converter and the timing controller and configured to transmit the digital signal to the timing controller from the analog-to-digital converter, and an input change switch selectively connecting the sensing line and the feedback transmission line of the display panel to the analog-to-digital converter.

The plurality of data driving integrated circuits may be disposed at different distances with respect to the gamma driver.

The display panel may include a plurality of driving regions driven by the plurality of data driving integrated circuits, respectively, the driving region may include a boundary region adjacent to a neighboring driving region, and the feedback transmission line may be connected to a data line disposed in the boundary region of the driving region among the plurality of data lines.

When the input change switch is turned on, the data voltage may be input to the analog-to-digital converter.

When the input change switch is turned on, the analog-to-digital converter may convert the data voltage to a BLVDS type digital signal and output the BLVDS type digital signal to the timing controller through the BLVDS line.

When the input change switch is turned off, a voltage of the sensing line of the display panel may be input to the analog-to-digital converter.

When the input change switch is turned off, the analog-to-digital converter may convert the voltage of the sensing line to a BLVDS type digital signal and output the BLVDS type digital signal to the timing controller through the BLVDS line.

The display panel may include a plurality of sub-pixels, and the sensing line may be connected to the sub-pixel to sense characteristic values of a driving transistor in the sub-pixel.

The sub-pixel may include an organic light emitting diode, a driving transistor configured to drive the organic light emitting diode, a first transistor electrically connected between a first node of the driving transistor and the data line, a second transistor electrically connected between a second node of the driving transistor and the sensing line, and a storage capacitor electrically connected between the first node and the second node of the driving transistor.

The timing controller may change the image data so that a luminance difference between the plurality of driving regions is within a preset range based on the digital signal transmitted from the analog-to-digital converter.

The plurality of driving regions may include a first driving region driven by a first data driving integrated circuit among the plurality of data driving integrated circuits, and a second driving region adjacent to the first driving region and driven by a second data driving integrated circuit disposed closer to the gamma driver than the first data driving integrated circuit among the plurality of data driving integrated circuits, the first and second driving regions may each include boundary regions adjacent to another neighboring driving region, and the timing controller may change the image data to allow the data voltages output to the boundary regions of the first and second driving regions to gradually increase from the first driving region to the second driving region.

The timing controller may control an output of the gamma driver so that the same gamma reference voltage is input to each of the plurality of data driving integrated circuits.

The output of the gamma driver to at least one of the plurality of data driving integrated circuits may differ from an output of the gamma driver to the remaining driving integrated circuits.

The plurality of driving regions may output an output image having the same luminance.

BRIEF DESCRIPTION OF THE DRAWINGS

FIGS. 7A and 7B are views showing data transmitted through the BLVDS line according to various embodiments of the present disclosure.

FIG. 12 is a view showing the compensation for each image data according to the first embodiment of the present disclosure.

FIG. 13 is a view showing data voltages of boundary regions according to the first embodiment of the present disclosure.

DETAILED DESCRIPTION

Figure 1:
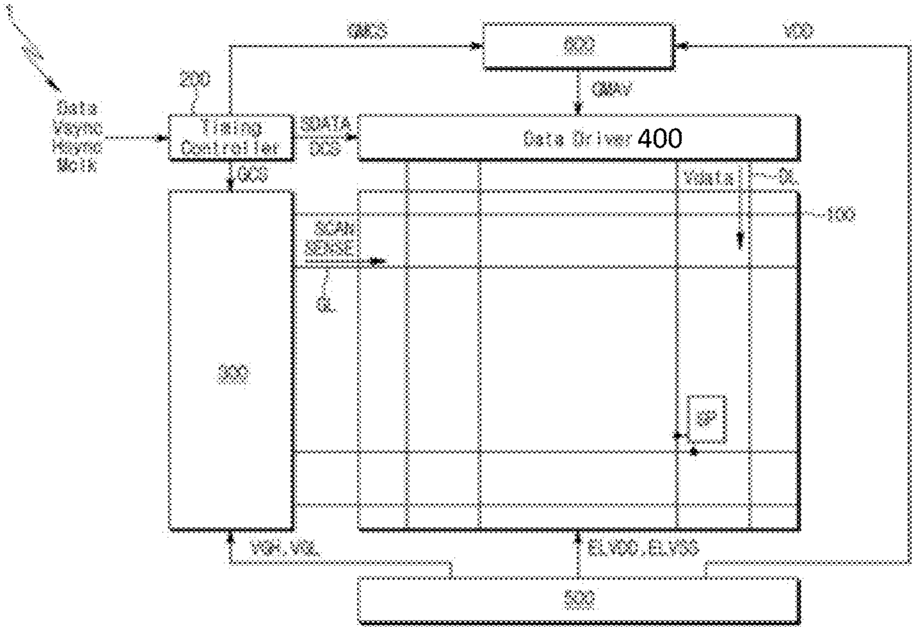
FIG. 1 is a block diagram of a display device according to various embodiments of the present disclosure.

Advantages and features of the present disclosure and methods for achieving them will become clear with reference to embodiments described below in detail in conjunction with the accompanying drawings. The present disclosure is not limited to the embodiments disclosed below but can be implemented in various different forms, these embodiments are merely provided to make the disclosure of the present disclosure complete and fully inform those skilled in the art to which the present disclosure pertains of the scope of the present disclosure, and the present disclosure is only defined by the scope of the appended claims.

Since shapes, sizes, ratios, angles, numbers, and the like disclosed in the drawings for describing the embodiments of the present disclosure are illustrative, the present disclosure is not limited to the shown items. The same reference number indicates the same components throughout the specification. In addition, in describing the present disclosure, when it is determined that the detailed description of a related known technology may unnecessarily obscure the gist of the present disclosure, detailed description thereof will be omitted.

When the terms “comprise,” “include,” “have,” and “comprising” described in the present specification are used, other parts may be added unless “only” is used. When a component is expressed in the singular, it can be construed as a plurality of components unless specifically stated otherwise.

In construing a component, the component is construed as including the margin of error even when there is no separate explicit description.

When the positional relationship is described, for example, when the positional relationship between two components is described using the term “on,” “above,” “under,” “next to,” or the like, one or more other components may be positioned between the components unless the term “immediately” or “directly” is used.

Although the term “first,” “second,” or the like may be used to distinguish components, functions or structures of the components are not limited by the ordinal number or component name added to the front of the component.

The following embodiments may be partially or fully coupled or combined, and various technological interworking and driving are possible. The embodiments may be implemented independently of each other and implemented together in the associated relationship.

Hereinafter, some embodiments of the present disclosure will be described in detail with reference to exemplary drawings. In adding reference numerals to components in each drawing, the same components may have the same reference numerals as much as possible even when they are shown in different drawings. In addition, in the description of the present disclosure, when it is determined that a detailed description of a related known configuration or function may obscure the gist of the present disclosure, detailed description thereof may be omitted.

FIG. 1 is a block diagram of a display device according to various embodiments of the present disclosure.

Referring to FIG. 1, a display device 1 according to various embodiments of the present disclosure may include a display panel 100, a timing controller 200, a gate driver 300, a data driver 400, a power driver 500, and a gamma driver 600.

The display panel 100 includes a pixel array in which input images are displayed on a screen. The pixel array may include a plurality of data lines DL, a plurality of gate lines GL intersecting the data lines DL, and a plurality of sub-pixels SP disposed in a matrix form. In the display panel 100, for example, the plurality of gate lines GL may be arranged in rows or columns, and the plurality of data lines DL may be arranged in columns or rows. Hereinafter, for convenience of description, it is assumed that the plurality of gate lines GL are disposed in rows and the plurality of data lines DL are disposed in columns.

The timing controller 200 may receive input image data DATA and timing signals synchronized therewith from an external source (e.g., a host system). The timing signal may include a vertical synchronization signal Vsync, a horizontal synchronization signal Hsync, a main clock Clk, etc.

The timing controller 200 may generate and output serial image data SDATA provided to the data driver 400, a data control signal DCS for controlling the data driver 400, and a gate control signal GCS for controlling the gate driver 300 based on the received timing signals. The timing controller 200 may be implemented as a component separately from the data driver 400 or implemented as an integrated circuit integrated with the data driver 400.

The gate driver 300 may sequentially output gate signals (scan signals) to the plurality of gate lines GL under the control of the timing controller 200. The gate driver 300 may sequentially output the signals to the plurality of gate lines GL by shifting the gate signals using a shift register unit. The data driving circuit 300 may be referred to as a scan driver.

The data driver 400 may receive the image data SDATA from the timing controller 200 and supply a data voltage Vdata to the plurality of data lines DL. The data driver 400 may be referred to as a source driver.

The data driver 400 may generate gamma compensation voltages V0 to V255 using gamma reference voltages GMAV provided from the gamma driver 600. The data driver 400 may convert pixel data of the input image data SDATA received as a digital signal from the timing controller 200 every frame period into the data voltage Vdata based on the gamma compensation voltages V0 to V255 and output the data voltage Vdata to the data line DL.

The power driver 500 may output direct current (DC) powers required to drive the pixel array of the display panel 100, the gate driver 300, the data driver 400, and the gamma driver 600 using a DC-DC converter. The power driver 500 may receive a DC input voltage and output DC voltages such as a gate high voltage VGH, a gate low voltage VGL, a high potential power voltage ELVDD, a low potential power voltage ELVSS, and a high potential reference voltage VDD.

Specifically, the gate high voltage VGH is a voltage set to threshold voltages or more of transistors formed in an array of sub-pixels SP. The gate high voltage VGH may be output to the gate driver 300 and supplied to the level shifter in the gate driver 300.

The gate low voltage VGL is a voltage lower than the threshold voltages of the transistors formed in the array of the sub-pixels SP. The gate low voltage VGL may be supplied to the level shifter in the gate driver 300.

The high potential power voltage ELVDD is a voltage supplied to an anode of a light emitting element and is a positive voltage for driving the light emitting element. The high potential power voltage ELVDD may be supplied to a high potential power voltage line connected to each sub-pixel SP in the display panel 100.

The low potential power voltage ELVSS is a voltage supplied to a cathode of a light emitting element and is a negative voltage for driving the light emitting element. The low potential power voltage ELVSS may be supplied to a low potential power voltage line connected to each sub-pixel SP in the display panel 100.

The high potential reference voltage VDD is a voltage output to the gamma driver 600. The high potential reference voltage VDD may be used as a reference for generating the gamma reference voltages GMAV.

The gamma driver 600 receives the high potential reference voltage VDD output from the power driver 500. The gate driver 600 receives a gamma control signal GMCS from the timing controller 200. The gamma driver 600 may generate a plurality of gamma reference voltages GMAV having values between the high potential reference voltage VDD and the ground voltage 0 V based on the gamma control signal GMCS. The data driver 400 may output the data voltage Vdata based on the gamma reference voltages GMAV supplied from the gamma driver 600.

Figure 2:
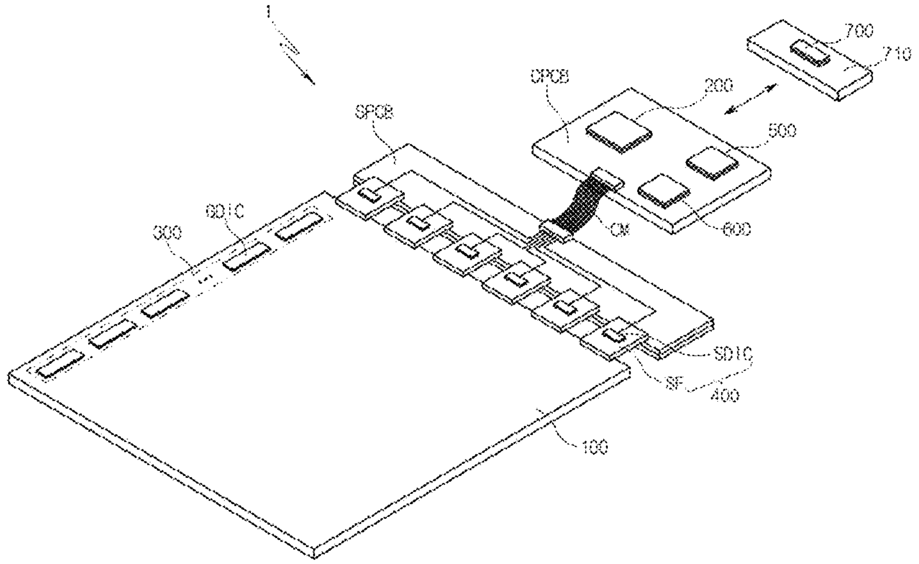
FIG. 2 is a perspective view of the display device according to various embodiments of the present disclosure.

FIG. 2 is a perspective view of the display device according to various embodiments of the present disclosure.

Referring to FIG. 2, the data driver 400 may include a plurality of data driver integrated circuits SDIC. The plurality of data driving integrated circuits SDIC may each be mounted on a source side circuit film SF using a chip on film (COF) method. One side of the source side circuit film SF may be electrically connected to the display panel 100. However, the present disclosure is not limited thereto, and the data driver 400 may be implemented in any of various ways, such as tape automated bonding TAB) and chip on glass (COG) methods.

The gate driver 300 may be mounted on the display panel 100 using a gate in panel (GIP) method. The gate driver 300 may include at least one gate driver integrated circuit GDIC.

The gate driver integrated circuit GDIC may be implemented as a GIP circuit formed directly on the display panel 100 together with a TFT array and lines of the pixel array. However, the present disclosure is not limited thereto, and the gate driver 300 may be implemented in any of various ways, such as TAB, COG, and COF methods.

The display device 1 may further include at least one source printed circuit board SPCB for circuit connection between the plurality of data driving integrated circuits SDIC and other elements, and a control printed circuit board CPCB for mounting control components and various electrical devices.

The at least one source printed circuit board SPCB and the control printed circuit board CPCB may be implemented by being integrated into one printed circuit board.

As shown in FIG. 2, the other side of the source circuit film SF on which the data driving integrated circuit SDIC is mounted may be connected to the at least one source printed circuit board SPCB. In other words, the source side circuit film SF may have one side connected to the display panel 100 and the other side connected to the control printed circuit board. The timing controller 200, the power driver 500, and the gamma driver 600 may be mounted on the control printed circuit board CPCB.

The at least one source printed circuit board SPCB and the control printed circuit board CPCB may be electrically connected through at least one connection member CM. For example, the connecting member CM may be a flexible printed circuit (FPC), a flexible flat cable (FFC), etc.

The display device 1 may further include a set board 710 electrically connected to the control printed circuit board CPCB and a main power management unit 700 mounted on the set board to manage the overall power of the display device 1.

The power driver 500 may be a circuit for managing power for a display module including the display panel 100 and the drivers 200, 300, 400, and 500 thereof, and the main power management unit 700 may be a circuit for managing the overall power of the display device 1 including the display module.

Each sub-pixel SP of the display device 1 according to the embodiments of the present disclosure may be formed of circuit elements such as an organic light emitting diode OLED that is a self-luminous element and a driving transistor for driving the organic light emitting diode OLED. The types and number of circuit elements constituting each sub-pixel SP may be determined in any of various ways according to the provided function, design method, etc.

Figure 3:
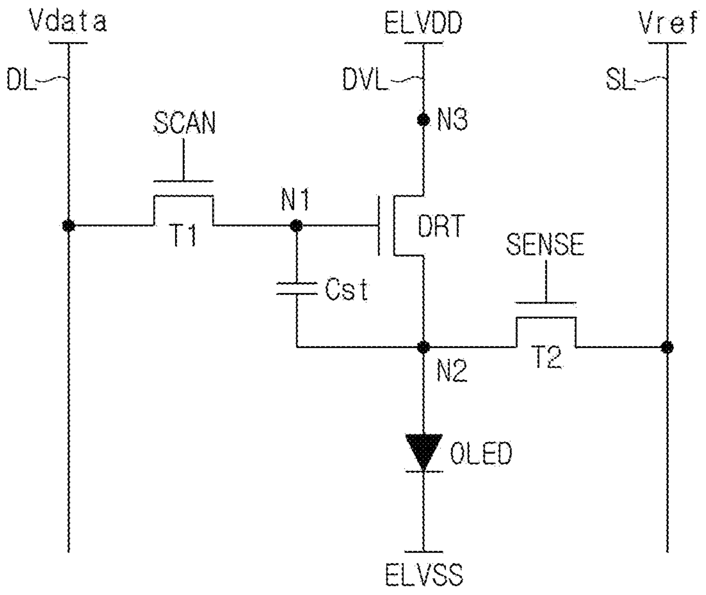
FIG. 3 is a view showing a circuit of a sub-pixel according to various embodiments of the present disclosure.

FIG. 3 is a view showing a circuit of a sub-pixel according to various embodiments of the present disclosure.

In the display panel 100 according to the embodiments of the present disclosure, a plurality of data lines DL, a plurality of gate lines GL, a plurality of driving voltage lines DVL, a plurality of sensing lines SL, etc. may be disposed.

Each sub-pixel SP in the display panel 100 may include an organic light emitting diode OLED, a driving transistor DRT for driving the organic light emitting diode OLED, a first transistor T1 electrically connected between a first node N1 of the driving transistor DRT and the corresponding data line DL, a second transistor T2 electrically connected between a second node N2 of the driving transistor DRT and the corresponding sensing line SL among a plurality of sensing lines SL, a storage capacitor Cst electrically connected between the first node N1 and the second node N2 of the driving transistor DRT, etc.

The organic light emitting diode OLED may include an anode, an organic light emitting layer, a cathode, etc.

Referring to an exemplary circuit of FIG. 3, an anode of the organic light emitting diode OLED may be electrically connected to a second node N2 of the driving transistor DRT. A base voltage ELVSS may be applied to a cathode of the organic light emitting diode OLED.

Here, the base voltage ELVSS may be, for example, a ground voltage or a higher or lower voltage than the ground voltage. In addition, the base voltage ELVSS may be changed depending on a driving state. For example, the base voltage ELVSS during imaging driving and the base voltage ELVSS during sensing driving may be set differently.

The driving transistor DRT drives the organic light emitting diode OLED by supplying a driving current to the organic light emitting diode OLED.

The driving transistor DRT may include the first node N1, the second node N2, a third node N3, etc.

The first node N1 of the driving transistor DRT may be a gate node and may be electrically connected to a source node or drain node of the first transistor T1. The second node N2 of the driving transistor DRT may be a source node or a drain node, electrically connected to an anode (or a cathode) of the organic light emitting diode OLED, and electrically connected to a source node or drain node of the second transistor T2. The third node N3 of the driving transistor DRT may be a drain node or a source node, may receive a driving voltage ELVDD, and may be electrically connected to a driving voltage line DVL through which the driving voltage ELVDD is supplied. Hereinafter, for convenience of description, an example in which in the driving transistor DRT, the first node N1 is a gate node, the second node N2 is a source node, and the third node N3 is a drain node may be described.

The storage capacitor Cst may be electrically connected between the first node N1 and the second node N2 of the driving transistor DRT to maintain a data voltage Vdata corresponding to an image signal voltage or the corresponding voltage for a frame time (or a set time).

The drain node or source node of the first transistor T1 may be electrically connected to the corresponding data line DL, the source node or drain node of the first transistor T1 may be electrically connected to the first node N1 of the driving transistor DRT, and the gate node of the first transistor T1 may be electrically connected to the corresponding gate line to receive a scan signal SCAN.

The first transistor T1 may be controlled to be turned on and off by receiving the scan signal SCAN at the gate node through the corresponding gate line.

The first transistor T1 may be turned on by the scan signal SCAN to transmit the data voltage Vdata supplied from the corresponding data line DL to the first node N1 of the driving transistor DRT.

The drain node or source node of the second transistor T2 may be electrically connected to the sensing line SL, and the source node or drain node of the second transistor T2 may be electrically connected to the second node N2 of the driving transistor DRT. The gate node of the second transistor T2 may be electrically connected to the corresponding gate line to receive a sense signal SENSE.

The second transistor T2 may be controlled to be turned on and off by receiving the sense signal SENSE at the gate node through the corresponding gate line.

The second transistor T2 may be turned on by the sense signal SENSE to transmit a reference voltage Vref supplied from the corresponding sensing line SL to the second node N2 of the driving transistor DRT.

Meanwhile, the storage capacitor Cst may be an external capacitor intentionally designed outside the driving transistor DRT rather than parasitic capacitors (e.g., Cgs and Cgd) that are internal capacitors present between the first node N1 and the second node N2 of the driving transistor DRT.

The driving transistor DRT, the first transistor T1, and the second transistor T2 may each be an n-type transistor or a p-type transistor.

Meanwhile, the scan signal SCAN and the sense signal SENSE may be separate gate signals. In this case, the scan signal SCAN and the sense signal SENSE may be applied to the gate node of the first transistor T1 and the gate node of the second transistor T2, respectively, through different gate lines.

In some cases, the scan signal SCAN and the sense signal SENSE may be the same gate signal. In this case, the gate signal SCAN and the sensing signal SENSE may be commonly applied to the gate node of the first transistor T1 and the gate node of the second transistor T2, respectively, through the same gate line.

A structure of each sub-pixel SP shown in FIG. 3 has a 3T (transistor) 1C (capacitor) structure, which is only an example for description, and the sub-pixel may further include one or more transistors or in some cases, one or more capacitors. Alternatively, each of the plurality of sub-pixels SP may have the same structure, and some of the plurality of sub-pixels SP may have different structures.

Figure 4:
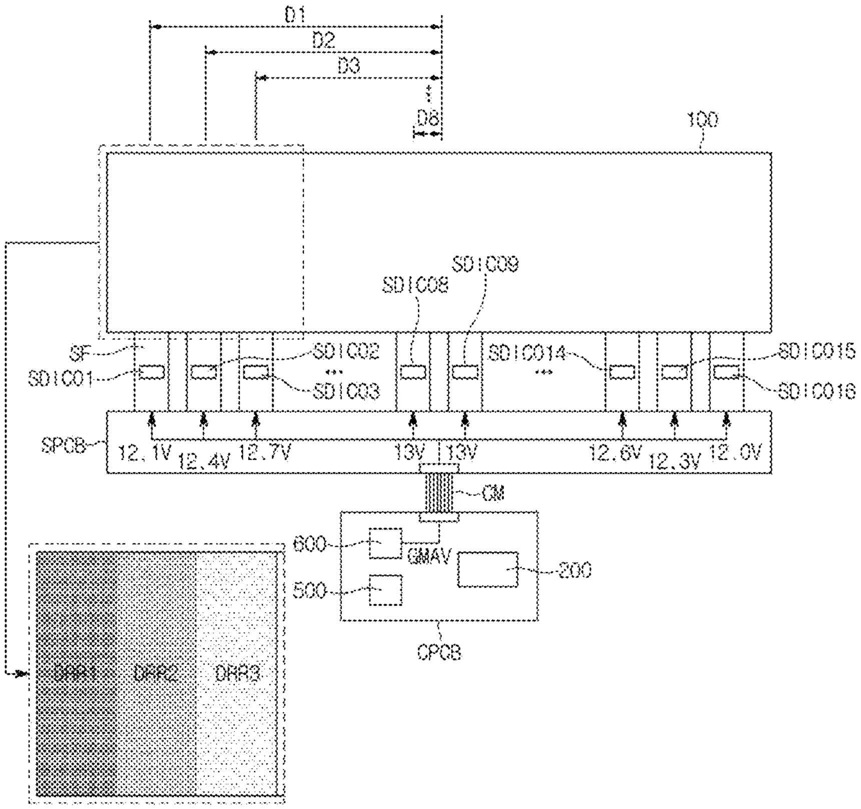
FIG. 4 is a plan view of the display device according to various embodiments of the present disclosure.

FIG. 4 is a plan view of the display device according to various embodiments of the present disclosure.

Referring to FIGS. 1 to 4, the display device 1 according to the embodiments of the present disclosure may control the luminance of the sub-pixels SP selected by the gate signal according to the grayscale of data. Specifically, the luminance of the sub-pixels SP may be controlled by the data driver 400 converting digital video data into the analog data voltage Vdata based on gamma compensation voltages V0 to V255 generated using the gamma reference voltages GMAV.

Meanwhile, referring to FIG. 4, the data driver 400 may include a plurality of data driver integrated circuits SDIC01 to SDIC16 arranged along one side of the display panel 100. Although FIG. 4 shows 16 data driving integrated circuits SDIC01 to SDIC16 as an example, the number of data driving integrated circuits is not limited thereto.

Distances at which the gamma reference voltages GMAV are transmitted from the gamma driver 600 or the connection member CM through which the gamma reference voltage GMAV are transmitted to each of the data driving integrated circuits SDIC01 to SDIC16 may be different for each data driving integrated circuit SDIC.

Therefore, there may be a difference between the gamma reference voltages GMAV applied to each data driving integrated circuit SDIC01 to SDIC16. In particular, in the case of the large display device 1, the distance at which the gamma reference voltages GMAV are transmitted and the difference therebetween are large, and thus there may be a significant difference between the gamma reference voltages GMAV input to each of the data driving integrated circuits SDIC01 to SDIC16.

Therefore, a luminance difference occurs between the driving regions of the display panel 100, which are driven by each of different data driving integrated circuits SDIC01 to SDIC16, and boundary lines between the driving regions in the output image may be visible.

For example, distances D1 to D8 at which the gamma reference voltages GMAV are transmitted from the gamma driver 600 or the connection member CM through which the gamma reference voltages GMAV are transmitted to each of the first to eighth data driving integrated circuits SDIC01 to SDIC8 may increase from the eighth data driving integrated circuit SDIC08 toward the first data driving integrated circuit SDIC01.

Therefore, even when the highest gamma reference voltage GMAV of the same magnitude such as 13 V is output to each of the data driving integrated circuit SDIC01 to SDIC16 by the gamma driver 600, while the highest gamma reference voltage GMAV of 12.1 V, 12.4 V, and 12.7 V that are lower than 13 V may be input to each of the first to third data driving integrated circuits SDIC01 to SDIC03 due to a voltage drop according to the transmission distance, the highest gamma reference voltage GMAV of 13 V may be input to the eighth data driving integrated circuit SDIC08.

Therefore, for example, as shown in the lower left corner of FIG. 4, since a luminance difference may occur between first to third driving regions DRR1 to DRR3 corresponding one-to-one to the first to third data driving integrated circuits SDIC01 to SDIC03, boundary lines BD_L between the driving regions DRR1 to DRR3 in the output image may be visible.

Similarly, even when the highest gamma reference voltage GMAV of 13 V is output to the ninth data driving integrated circuit SDIC09, the highest gamma reference voltage GMAV of 12.6 V, 12.3 V, and 12.0 V may be input to each of the $14^{th}$ to $16^{th}$ data driving integrated circuits SDIC14 to SDIC16. Therefore, for example, since a luminance difference occurs between $14^{th}$ to $16^{th}$ driving regions (not shown) corresponding one-to-one to the $14^{th}$ to $16^{th}$ data driving integrated circuits SDIC14 to SDIC16, boundary lines between the driving regions in the output image may be visible.

Therefore, the embodiments of the present disclosure may provide the display device 1 in which the phenomenon that the boundary line are visible can be prevented. This will be described in more detail with reference to FIGS. 5 to 16.

Figure 5:
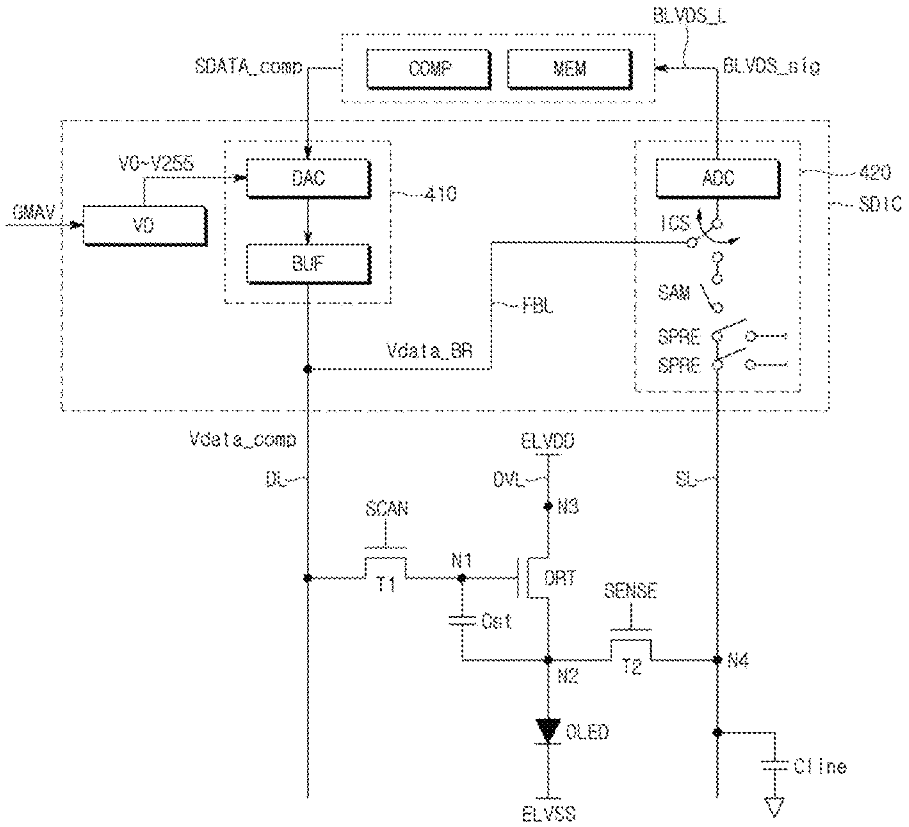
FIG. 5 is a view showing a data driving integrated circuit according to various embodiments of the present disclosure.

FIG. 5 is a view showing a data driving integrated circuit according to various embodiments of the present disclosure.

Referring to FIG. 5, the data driving integrated circuit SDIC may include a data voltage output circuit 410 and a sensing circuit 420.

The data voltage output circuit 410 may generate the data voltage Vdata by converting digital video data in response to a source timing control signal included in the data control signal DCS from the timing controller 200, and supply the data voltage Vdata to the data line DL of the display panel 100 to be synchronized with the gate signal.

The data voltage output circuit 410 may include a shift register (not shown), a latch circuit (not shown), a gamma voltage generator VD, a digital-to-analog converter DAC, and an output buffer BUF. To simplify the drawing, the shift register and the latch circuit are omitted in FIG. 4.

The shift register may provide parallelized data to a latch. The shift register may generate a latch clock signal and provide the latch clock to the latch, and the latch clock signal may be used to control the timing at which the parallelized data is output.

The latch may latch or temporarily store data sequentially received from the shift register and transmit the data to the digital-to-analog converter.

The gamma voltage generator VD includes a resistor string and gamma buffers for transmitting a plurality of gamma reference voltages GMAV to tabs of the resistor string. The gamma voltage generator VD may divide the gamma reference voltage GMAV supplied from the gamma driver 600 through the resistor string and generate gamma compensation voltages V0 to V255 having various voltage levels.

The digital-to-analog converter 340 may convert digital data (i.e., grayscale value of the parallelized data DATA) into an analog data signal (or the data voltage Vdata) using the gamma compensation voltages V0 to V255.

The output buffer BUF may receive the data signal and output the data signal to the data lines DL. The output buffer BUF may include source buffers connected to the data lines DL.

For convenience of description, FIG. 5 schematically shows one data line DL and one sensing line SL for one sub-pixel circuit. However, the output buffer BUF may be connected to a plurality of data lines DL, and the analog-to-digital converter ADC may be connected to a plurality of sensing lines SL and a plurality of feedback transmission lines FBL.

The sensing circuit 420 may sense characteristic values or changes in characteristic values of the driving transistor DRT in the sub-pixel SP by driving (performing sensing driving for) the sub-pixel SP having a 3T1C structure or a modified structure based on the same.

The sensing circuit 420 may be present outside a data driving circuit 120 (e.g., a PCB), but included inside the data driving circuit 120.

The sensing circuit 420 may include an analog-to-digital converter ADC for sensing a voltage of the sensing line SL corresponding to a voltage at the second node N2 of the driving transistor DRT and converting the sensed voltage into a sensing value corresponding to a digital value, and a switch circuit for controlling a voltage state of the sensing line SL by supplying a reference voltage during sensing driving or image driving or control the connection between the sensing line SL and the analog-to-digital converter ADC.

The switch circuit may include a plurality of switches ICS, SAM, SPRE, and RPRE, and the plurality of switches ICS, SAM, SPRE, and RPRE may each be implemented as a separate switch, or implemented by integrating at least two into one.

The analog-to-digital converter ADC may convert the voltage of the sensing line SL into a bus low voltage differential signaling (BLVDS) type digital signal BLVDS_sig and output the digital signal BLVDS_sig to the timing controller 200 through the BLVDS line BLVDS_L.

The timing controller 200 may include a memory MEM for storing sensing values output from the analog-to-digital converter ADC through the BLVDS_L or in which a reference sensing value is stored in advance, and a compensator COMP (e.g., a circuit) for comparing the sensing value stored in the memory MEM with the reference sensing value stored in the memory MEM and calculating a compensation value compensating a difference in characteristic values. The compensation values calculated by the compensator COMP may be stored in the memory MEM.

The timing controller 200 may change the image data SDATA to be supplied to the data driver 400 using the compensation value calculated by the compensator COMP and output changed image data SDATA_comp to the digital-to-analog converter.

The digital-to-analog converter DAC may convert the changed image data SDATA_comp into the data voltage Vdata_comp in the form of an analog signal and output the converted data voltage Vdata_comp to the data line DL through the output buffer BUF. Therefore, the difference in characteristic values (difference in threshold voltages or difference in mobilities) of the driving transistor DRT of the corresponding sub-pixel SP may be compensated.

The sensing circuit 420 may further sense the data voltage Vdata output from the output buffer BUF of the data voltage output circuit 410 to the plurality of data lines DL. The sensing of the data voltage Vdata may be performed using the analog-to-digital converter ADC and the BLVDS line BLVDS_L that are used for sensing the sensing line SL.

The analog-to-digital converter ADC may be connected to each of the plurality of data lines DL by the plurality of feedback transmission lines FBL. The sensing circuit 420 may sense the data voltage Vdata applied to the data line DL. The plurality of sensing lines SL may be connected to the analog-to-digital converter ADC.

The sensing circuit 420 may selectively sense the data voltages Vdata applied to the data lines DL disposed in a boundary region (the boundary region will be described in detail below with reference to FIG. 8) adjacent to another driving region of each driving region among the plurality of data lines DL. The feedback transmission line FBL may be connected to the data line (DL) disposed in the boundary region among the plurality of data lines DL. However, the present disclosure is not limited thereto, and the sensing circuit 420 may sense all data voltages Vdata supplied to the plurality of data lines DL.

The data voltage Vdata may be transmitted to the analog-to-digital converter ADC through the feedback transmission line FBL connected to the data line DL.

The analog-to-digital converter ADC may convert the data voltage Vdata into the BLVDS type digital signal BLSVD_sig and output the digital signal BLVDS_sig to the timing controller 200 through the BLVDS line BLVDS_L.

Referring to FIGS. 2, 4, and 5, the timing controller 200 may be connected to the plurality of data driving integrated circuits SDIC. The timing controller 200 may perform control for compensating the luminance difference between the driving regions based on the digital signals BLVDS_sig received from the analog-to-digital converters ADC of the plurality of data driving integrated circuits SDIC.

The timing controller 200 may change the image data SDATA and/or change the gamma reference voltage GMAV to compensate the luminance difference between the driving regions. A specific operation of the timing controller 200 will be described below with reference to FIGS. 10 to 16.

As described above, the timing controller 200 may include the compensator COMP and the memory MEM. The memory MEM may store a data voltage value output as the digital signal BLVDS_sig from the analog-to-digital converter ADC or store a reference data voltage value in advance, and the compensator COMP may compare a reference data voltage value stored in the memory MEM with the data voltage value.

The compensation for the difference in characteristic values of the driving transistor DRT and the difference in gamma reference voltages GMAV may be implemented using one compensator COMP or implemented by a separate individual compensator.

The switch circuit of the sensing circuit 420 may further include an input change switch ICS for controlling the connection of the feedback transmission line FBL and the sensing line with the analog-to-digital converter ADC.

The feedback transmission line FBL or the scan line may be selectively connected to the analog-to-digital converter ADC by the input change switch ICS. When the input change switch ICS is turned on, the feedback transmission line FBL may be connected to the analog-to-digital converter ADC. When the input change switch ICS is turned off, the scan line may be connected to the analog-to-digital converter ADC.

Figure 6:
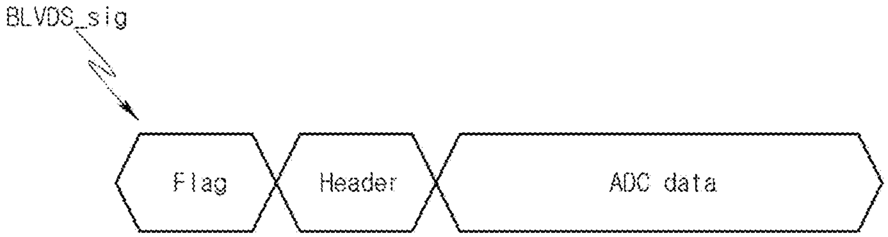
FIG. 6 is a view showing a data packet structure of a signal transmitted through an BLVDS line according to various embodiments of the present disclosure.

FIG. 6 is a view showing a data packet structure of a signal transmitted through an BLVDS line according to various embodiments of the present disclosure. FIGS. 7A and 7B are views showing data transmitted through the BLVDS line according to various embodiments of the present disclosure.

Referring to FIGS. 6 and 7A and 7B, as described above, the analog-to-digital converter ADC may transmit the BLVDS type digital signal BLVDS_sig to the timing controller 200 through the BLVDS line BLVDS_L.

The digital signal BLVDS_sig may be transmitted in the form of the data packet including a flag Flag indicating the start of data transmission, a header Header indicating what signal the subsequent analog-to-digital conversion data ADC data is, and the analog-to-digital conversion data ADC data. The analog-to-digital conversion data ADC data included in the digital signal BLVDS_sig may be changed depending on the operation of the input change switch ICS.

Referring to FIG. 7A, when the input change switch ICS is turned on, the analog-to-digital conversion data ADC data included in the digital signal BLVDS_sig may include the voltage values SIO1 to SIO240 of the sensing lines.

Referring to FIG. 7B, when the input change switch ICS is turned off, the analog-to-digital conversion data ADC data included in the digital signal BLVDS_sig may include data voltage values Vdata1 to Vdata960. The digital signal BLVDS_sig may selectively include only the voltage value corresponding to the boundary region of each driving region among the data voltage values Vdata1 to Vdata960.

Hereinafter, the compensation for the luminance difference between two driving regions among the plurality of driving regions driven by the plurality of data driving integrated circuits SDIC, respectively will be exemplarily described in FIGS. 8 to 15. However, it goes without saying that the following description may be commonly applied to the plurality of driving regions.

Figures 8, 9:
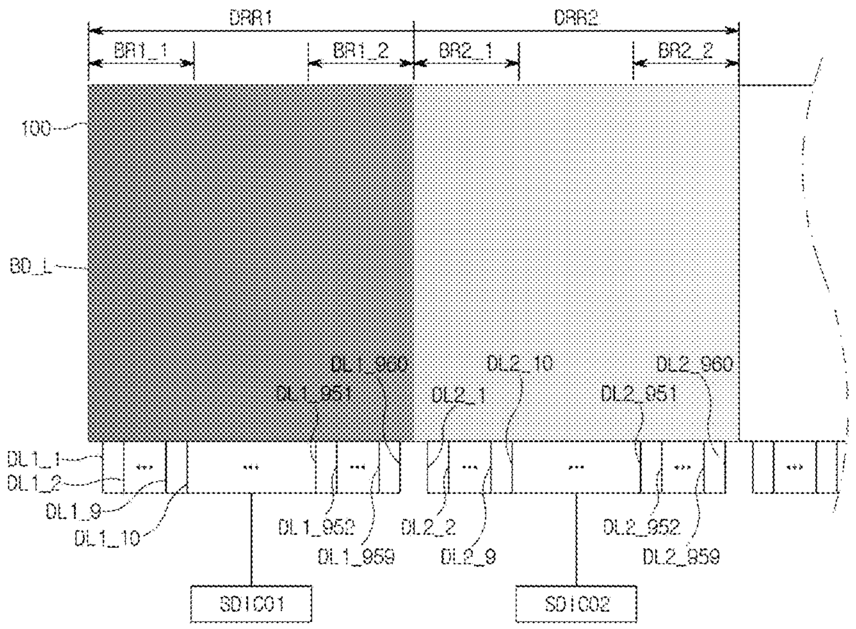
FIG. 8 is a view showing a first driving region and a second driving region of a display panel according to a comparative example of the present disclosure.
FIG. 9 is a view showing data voltages of boundary regions according to the comparative example of the present disclosure.

FIG. 8 is a view showing a first driving region and a second driving region of a display panel according to a comparative example of the present disclosure. FIG. 9 is a view showing data voltages of boundary regions according to the comparative example of the present disclosure.

Referring to FIG. 8, a plurality of driving regions DRR1 and DRR2 may include the first driving region DRR1 and the second driving region DRR2 adjacent to the first driving region DRR1. The first driving region DRR1 may be located at the outermost side of the display panel 100. The second driving region DRR2 adjacent to the first driving region DRR1 may be disposed inside the first driving region DRR1 and connected to the first driving region DRR1. However, the present disclosure is not limited thereto, and the first driving region DRR1 may be located on a central portion of the display panel 100.

Each of the plurality of driving regions DRR1 and DRR2 may have a substantially rectangular shape having four sides in a plan view.

Hereinafter, one side of the four sides of the first driving region DRR1, such as one side located at the left side of FIG. 8, is referred to as one side boundary, and the other side opposite to the one side of the four sides of the first driving region DRR1, such as one side located at the right side of FIG. 8, is referred to as the other side boundary.

In addition, a region adjacent to the one side boundary of the first driving region DRR1 and extending along the one side boundary is referred to as one side boundary region BR1_1, and a region adjacent to the other side boundary of the first driving region DRR1 and extending along the other side boundary is referred to as the other side boundary region BR1_2.

Even in the second driving region, like the first driving region DRR1, one side boundary, the other side boundary, one side boundary region BR2_1, and the other side boundary region BR2_2 can be defined.

The one side boundary regions BR1_1 and BR2_1 and the other side boundary regions BR1_2 and BR2_2 may be referred to as a first boundary region and a second boundary region, respectively. The other side boundary of the first driving region DRR1 may match the one side boundary of the second driving region DRR2. The other side boundary region BR1_2 of the first driving region DRR1 may be in contact with the one side boundary region BR2_1 of the second driving region DRR2. The other side boundary region BR1_2 of the first driving region DRR1 and the one side boundary region BR2_1 of the second driving region DRR2 may be referred to as boundary portions of the first driving region DRR1 and the second driving region DRR2.

The plurality of data lines DL may be disposed in the first and second driving regions DRR1 and DRR2. At least one data line DL may be disposed in the boundary regions BR1_1, BR1_2, BR2_1, and BR2_2 of the first and second driving regions DRR1 and DRR2. In FIG. 8, to simplify the drawing, data lines DL excluding data lines DL1_1 to DL1_10, DL1_951 to DL1_960, DL2_1 to DL2_10, and DL2_951 to DL2_960 disposed in the boundary regions BR1_1, BR1_2, BR2_1, and BR2_2 are omitted.

Hereinafter, an example in which 10 data lines DL1_1 to DL1_10, DL1_951 to DL1_960, DL2_1 to DL2_10, and DL2_951 to DL2_960 are disposed in each boundary region will be described. However, the boundary regions BR1_1, BR1_2, BR2_1, and BR2_2 can be defined as specific regions that require control to prevent the boundary line visible due to the luminance difference in the driving regions DRR1 and DD2, and the ranges of the boundary regions BR1_1, BR1_2, BR2_1, and BR2_2 and the number of data lines DL disposed therein may be changed in any of various ways.

Referring to FIGS. 8 and 9, a distance at which the gamma reference voltage GMAV is transmitted from the gamma driver 600 of the first data driving integrated circuit SDIC may be greater than a distance at which the gamma reference voltage GMAV is transmitted from the gamma driver 600 of the second data driving integrated circuit SDIC. The gamma reference voltage GMAV lower than that of the second data driving integrated circuit SDIC may be input to the first data driving integrated circuit SDIC. For example, the highest gamma reference voltage GMAV of about 12.1 V may be input to the first data driving integrated circuit SDIC, and the highest gamma reference voltage GMAV of about 12.4 V may be input to the second data driving integrated circuit SDIC.

In this case, as shown in FIG. 9, a data voltage Vdata of about 2 V may be, for example, input to the data lines DL1_951 to DL1_960 disposed in the other side boundary region BR1_2 of the first driving region DRR1, and a data voltage Vdata of about 3 V may be, for example, output to the data lines DL2_1 to DL2_1 disposed in the one side boundary region BR2_1 of the second driving region DRR2. Therefore, a visible boundary line may be formed between the first driving region DRR1 and the second driving region DRR2.

Figure 10:
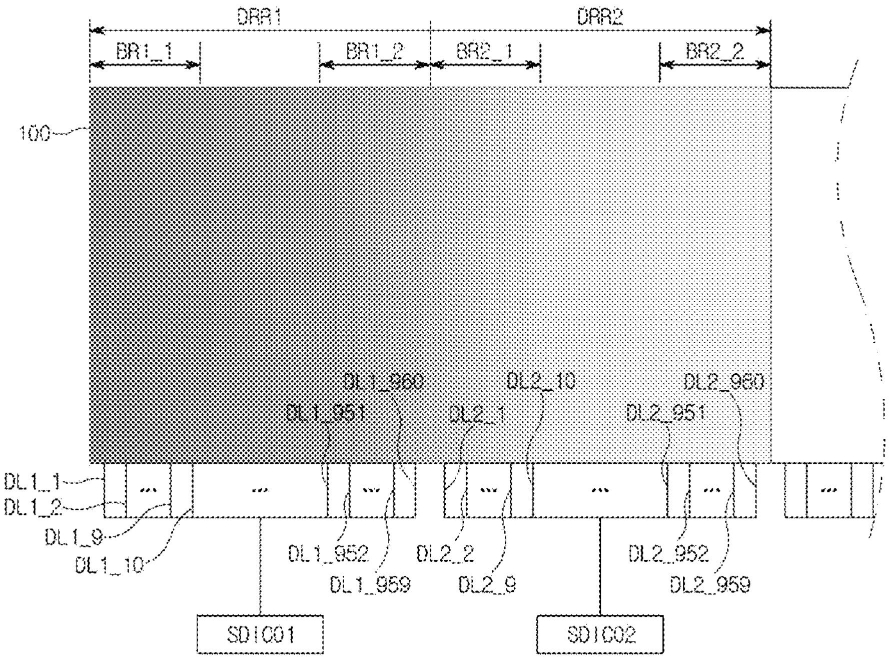
FIG. 10 is a view showing a first driving region and a second driving region of a display panel according to a first embodiment of the present disclosure.
Figure 11:
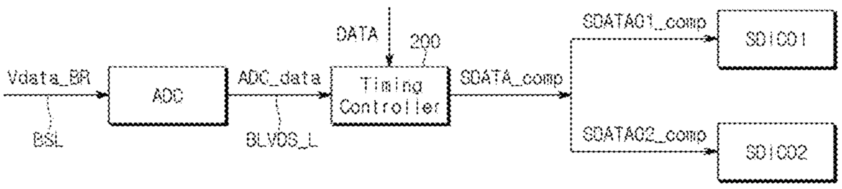
FIG. 11 is a view showing a compensation process of image data according to the first embodiment of the present disclosure.

FIG. 10 is a view showing a first driving region and a second driving region of a display panel according to a first embodiment of the present disclosure. FIG. 11 is a view showing a compensation process of image data according to the first embodiment of the present disclosure. FIG. 12 is a view showing the compensation for each image data according to the first embodiment of the present disclosure. FIG. 13 is a view showing data voltages of boundary regions according to the first embodiment of the present disclosure.

Referring to FIGS. 10 to 13, the timing controller 200 may change the image data SDATA so that the luminance difference between the plurality of driving regions DRR1 and DRR2 is within a preset difference range.

The timing controller 200 may determine whether a difference in the data voltages between the plurality of driving regions DRR1 and DRR2 exceeds a preset voltage difference range based on the digital signal BLVDS_sig received from the analog-to-digital converter ADC. The timing controller 200 may change the image data SDATA when a difference in the data voltages between the plurality of driving regions DRR1 and DRR2 exceeds the preset voltage difference range.

As the timing controller 200 may change the image data SDATA so that the data voltages Vdata of the data lines DL1_951~DL1_960 and DL2_1~DL2_10 of the other side boundary region BR1_2 of the first driving region DRR1 and the one side boundary region BR2_1 of the second driving region DRR2 are gradually changed from the first driving region DRR1 to the second driving region DRR2.

Referring to FIGS. 10 and 11, the data voltages Vdata1 to Vdata10 and Vdata951 to Vdata960 of the data lines DL1_1 to DL1_10, DL1_951 to DL1_960, DL2_1 to DL2_10, and DL2_951 to DL2_960 disposed in the boundary regions BR1_1, BR1_2, BR2_1, and BR2_2 of the first and second driving regions DRR1 and DRR2 may be transmitted to the analog-to-digital converter ADC through the feedback transmission line FBL.

The analog-to-digital converter ADC may convert the data voltages DL1_1 to DL1_10, DL1_951 to DL1_960, DL2_1 to DL2_10, and DL2_951 to D2_960 of the boundary regions BR1_1, BR1_2, BR2_1, and BR2_2 of the first and second driving regions DRR1 and DRR2 into the digital signal BLVDS_sig and output the digital signal BLVDS_sig to the timing controller 200 through the BLVDS line BLVDS_L. The analog-to-digital conversion data ADC data of the digital signal BLVDS_sig may include the digital value corresponding to the data voltages Vdata1 to Vdata10 and Vdata951 to Vdata960 of the boundary regions BR1_1, BR1_2, BR2_1, and BR2_2 of the first and second driving regions DRR1 and DRR2.

Referring to FIG. 11, the timing controller 200 may change the image data SDATA to be supplied to the first and second data driving integrated circuits SDIC01 and SDIC02 based on the data voltages Vdata1 to Vdata10 and Vdata951 to Vdata960 of the boundary regions BR1_1, BR1_2, BR2_1, and BR2_2 of the first and second driving regions DRR1 and DRR2 received from the analog-to-digital converter ADC and output the changed image data SDATA01_comp and SDATA02_comp to the digital-to-analog converters DAC of the first and second data driving integrated circuits SDIC01 and SDIC02. The timing controller 200 may change the image data SDATA using the compensation value calculated by the compensator COMP and/or the compensation value previously stored in the memory MEM.

Referring to FIGS. 12 and 13, the timing controller 200 may change the image data SDATA as the data voltages Vdata1 to Vdata10 and Vdata951 to Vdata960 of the data lines DL1_1 to DL1_10, DL1_951 to DL1_960, DL2_1 to DL2_10, and DL2_951 to DL2_960 disposed in the boundary regions BR1_1, BR1_2, BR2_1, and BR2_2 gradually increase from the first driving region DRR1 to the second driving region DRR2.

The timing controller 200 may change data voltage values D1 to D10 and D951 to D960 by adding or subtracting the preset compensation value to or from the data voltage values D1 to D10 and D951 to D960 of the image data SDATA supplied to data channels corresponding to the boundary regions of the data channels of the data driving integrated circuit SDIC.

Referring to FIG. 12, the timing controller 200 may generate changed first image data SDATA01_comp by adding preset compensation values a1 to a10 to the data voltages D951 to D960 supplied to data channels corresponding to the other side boundary region BR1_2 of the first driving region DRR1, such as $951^{th}$ to $960^{th}$ data channels, respectively, among the first image data SDATA01 applied to the first data driving integrated circuit SDIC01. The preset compensation values a1 to a10 may gradually increase toward the second driving region DRR2.

The timing controller 200 may generate changed second image data SDATA02_comp by subtracting the preset compensation values from the data voltages D1 to D10 supplied to data channels corresponding to the one side boundary region BR2_1 of the second driving region DRR2, such as first to tenth data channels among the second image data SDATA02 applied to the second data driving integrated circuit SDIC02. The preset compensation values b1 to b10 may gradually increase toward the first driving region DRR1.

Therefore, as shown in FIG. 13, the data voltages Vdata951 to Vdata960 in the range of about 2 V to 2.45 V may be, for example, supplied to the data lines DL1_951 to DL1_960, respectively, of the other side boundary region BR1_2 of the first driving region DRR1 to gradually increase toward the second driving region DRR2, and the data voltages Vdata1 to Vdata10 in the range of about 2.5 V to 3 V may be, for example, supplied to the data lines DL2_1 to DL2_10 of the one side boundary region BR2_1 of the second driving region DRR2, respectively, to gradually decrease toward the second driving region DRR2. Therefore, as shown in FIG. 10, the boundary line in the output image can be removed.

Figure 14:
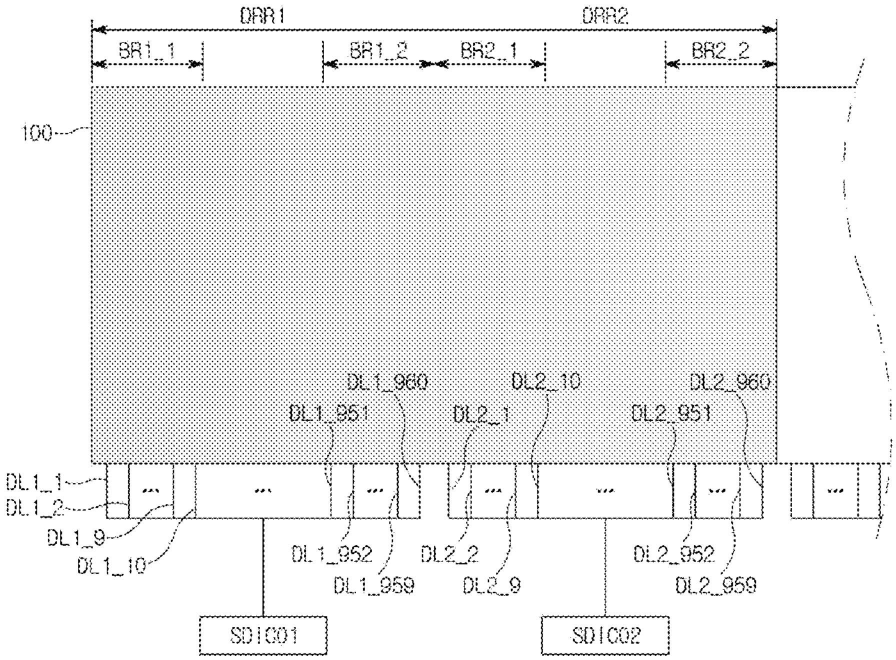
FIG. 14 is a view showing a first driving region and a second driving region of a display panel according to a second embodiment of the present disclosure.
Figures 15, 16:
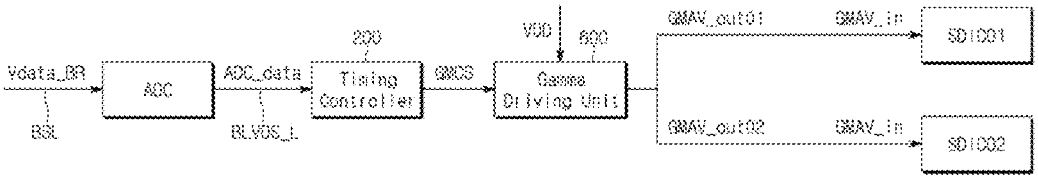
FIG. 15 is a view showing a change in gamma reference voltage according to the second embodiment of the present disclosure.
FIG. 16 is a view showing data voltages of boundary regions according to the second embodiment of the present disclosure.

FIG. 14 is a view showing a first driving region and a second driving region of a display panel according to a second embodiment of the present disclosure. FIG. 15 is a view showing a change in gamma reference voltage according to the second embodiment of the present disclosure. FIG. 16 is a view showing data voltages of boundary regions according to the second embodiment of the present disclosure.

Referring to FIGS. 14 to 16, the gamma driver 600 may be set to allow the plurality of driving regions DRR1 and DRR2 to output images with substantially the same luminance.

The gamma driver 600 may change the gamma reference voltage GMAV to allow the plurality of driving regions DRR1 and DRR2 output the images with substantially the same luminance. By changing the gamma reference voltage GMAV, the data voltages Vdata output to the plurality of driving regions DRR1 and DRR2 may be substantially the same. The above-described operation of the gamma driver 600 may be controlled by the timing controller 200. In other words, the second embodiment differs from the first embodiment in that the gamma reference voltage GMAV rather than the image data SDATA is changed.

"Gamma reference voltage GMAV" to be described below may indicate the highest gamma reference voltage GMAV among the plurality of gamma reference voltages GMAV generated by the gamma driver 600, and the change in gamma reference voltage GMAV may indicate a change in the highest gamma reference voltage GMAV and changes in set of the gamma reference voltages GMAV supplied to a specific data driving integrated circuit SDIC accordingly. However, the present disclosure is not limited thereto, and "gamma reference voltage GMAV" may indicate a specific gamma reference voltage GMAV corresponding to a specific grayscale value.

Referring to FIGS. 14 and 15, the timing controller 200 may determine whether the data voltage between the plurality of driving regions DRR1 and DRR2 exceeds the preset voltage difference range based on the digital signal BLVDS_sig received from the analog-to-digital converter ADC. When the data voltage output to the plurality of driving regions DRR1 and DRR2 exceeds the preset voltage difference range, the timing controller 200 may control the gamma driver 600 to change the gamma reference voltage GMAV output to each of the data driving integrated circuits SDIC01 and SDIC02. Under the control of the timing controller 200, the gamma driver 600 may output the gamma reference voltage GMAV to a gamma voltage generator VD of each of the data driving integrated circuits SDIC01 and SDIC02 so that the data voltages Vdata output to the plurality of driving regions DRR1 and DRR2 are the same.

Referring to FIGS. 15 and 16, the timing controller 200 may control the gamma driver 600 so that the same gamma reference voltage GMAV is input to each of the first and second data driving integrated circuits SDIC01 and SDIC02.

As described above, a distance from the gamma driver 600 to each of the data driving integrated circuits SDIC may be different for each data driving integrated circuit SDIC. Therefore, the timing controller 200 may control the gamma driver 600 to output different gamma reference voltages GMAV to each of the data drive integrated circuits SDIC and/or a conductor connected thereto. Therefore, the gamma reference voltages GMAV input to the plurality of data driving integrated circuits SDIC may be substantially the same.

The gamma driver 600 may output different gamma reference voltages GMAV_out01 and GMAV_out02 to the first and second data driving integrated circuits SDIC01 and SDIC02 and/or conductors connected thereto, respectively. The gamma driver 600 may have the gamma reference voltage GMAV_out01 output to the first data driving integrated circuit SDIC and/or the conductor connected thereto that is greater than the gamma reference voltage GMAV_out02 output to the second data drive integrated circuit SDIC and/or the conductor connected thereto. Gamma reference voltages GMAV_in actually input to the first and second data driving integrated circuits SDIC01 and SDIC02 may be the same.

The timing controller 200 may generate the gamma control signal GMCS for adjusting the gamma reference voltage GMAV using the compensation value calculated by the compensator COMP and/or the compensation value previously stored in the memory MEM.

The timing controller 200 may change the gamma reference voltage GMAV value included in the gamma control signal GMCS using the compensation value calculated by the compensator COMP. The timing controller 200 may output the gamma control signal GMCS including the changed gamma reference voltage GMAV value to the gamma driver 600.

The timing controller 200 may calculate the gamma reference voltage GMAV_out01 output to the first data driving integrated circuit SDIC01 by adding a preset compensation value to the gamma reference voltage GMAV_out02 value output to the second data driving integrated circuit SDIC02. Conversely, the timing controller 200 may calculate the gamma reference voltage GMAV_out02 output to the second data driving integrated circuit SDIC02 by subtracting the preset compensation value from the gamma reference voltage GMAV_out01 value output to the first data driving integrated circuit SDIC01.

Referring to FIG. 13, as the same gamma reference voltage GMAV_in is input to the first and second data driving integrated circuits SDIC01 and SDIC02, the same data voltages Vdata1 to 10 and Vdata951 to Vdata960 of about 2.5 V may be, for example, output to the data lines DL1_951 to DL1_960 of the other side boundary region BR1_2 of the first driving region DRR1 and the data lines DL2_1 to DL2_10 of the one side boundary region BR2_1 of the second driving region DRR2. Therefore, as shown in FIG. 14, the boundary line in the output image can be removed.

According to the display device according to the embodiments, it is possible to prevent or at least reduce the formation of the boundary line caused by the luminance difference in the output image.

The display device according to the embodiments, it is possible to simplify the structure and reduce the manufacturing cost.

The effects of the present disclosure are not limited to the above-described effects, and other effects that are not mentioned will be able to be clearly understood by those skilled in the art from the above detailed description.

The above description and the accompanying drawings are merely illustrative of the technical spirit of the present disclosure, and those skilled in the art to which the present disclosure pertains can perform various changes or modifications, such as coupling, separation, substitution, and change of components, without departing from the essential characteristics of the present disclosure. Therefore, the embodiments disclosed herein are not intended to limit the technical spirit of the present disclosure, but to describe the same, and the scope of the technical spirit of the present disclosure is not limited by these embodiments. The scope of the present disclosure should be construed according to the appended claims, and all technical spirits within the equivalent range should be construed as being included in the scope of the present disclosure.

What is claimed is:

1. A display device comprising:

a display panel including a plurality of data lines and a sensing line;

a plurality of data driving integrated circuits configured to apply data voltages to the plurality of data lines;

a timing controller configured to output image data to the plurality of data driving integrated circuits; and a gamma driver configured to output gamma reference voltages to the plurality of data driving integrated circuits, wherein a data driving integrated circuit from the plurality of data driving integrated circuits includes:

a data voltage output circuit configured to output a data voltage from the data voltages to a data line from the plurality of data lines;

a feedback transmission line having one side connected to the data line;

an analog-to-digital converter connected to another side of the feedback transmission line, the analog-to-digital converter configured to convert the data voltage transmitted through the feedback transmission line into a digital signal and output the digital signal to the timing controller, a bus low voltage differential signaling (BLVDS) line between the analog-to-digital converter and the timing controller, the BLVDS line configured to transmit the digital signal to the timing controller from the analog-to-digital converter; and an input change switch selectively connecting the sensing line and the feedback transmission line of the display panel to the analog-to-digital converter.

2. The display device of claim 1, wherein the plurality of data driving integrated circuits are disposed at different distances with respect to the gamma driver.

3. The display device of claim 1, wherein the display panel includes a plurality of driving regions driven by the plurality of data driving integrated circuits, respectively, the plurality of driving regions include a boundary region adjacent to a neighboring driving region, and the feedback transmission line is connected to a data line from the plurality of data lines that is disposed in the boundary region of the driving region.

4. The display device of claim 3, wherein the timing controller changes the image data such that a luminance difference between the plurality of driving regions is within a preset range based on the digital signal transmitted from the analog-to-digital converter.

5. The display device of claim 4, wherein the plurality of driving regions include a first driving region driven by a first data driving integrated circuit among the plurality of data driving integrated circuits, and a second driving region adjacent to the first driving region and driven by a second data driving integrated circuit among the plurality of data driving integrated circuits that is closer to the gamma driver than the first data driving integrated circuit, the first driving region and the second driving region each include boundary regions adjacent to another neighboring driving region, and the timing controller changes the image data to allow the data voltages output to the boundary regions of the first driving region and the second driving region to gradually increase from the first driving region to the second driving region.

6. The display device of claim 3, wherein the timing controller controls an output of the gamma driver such that a same gamma reference voltage is input to each of the plurality of data driving integrated circuits.

7. The display device of claim 6, wherein the output of the gamma driver to at least one of the plurality of data driving integrated circuits differs from an output of the gamma driver to remaining driving integrated circuits.

8. The display device of claim 6, wherein the plurality of driving regions output an output image having a same luminance.

9. The display device of claim 1, wherein, when the input change switch is turned on, the data voltage is input to the analog-to-digital converter.

10. The display device of claim 9, wherein, when the input change switch is turned on, the analog-to-digital converter converts the data voltage to a BLVDS type digital signal and outputs the BLVDS type digital signal to the timing controller through the BLVDS line.

11. The display device of claim 1, wherein, when the input change switch is turned off, a voltage of the sensing line of the display panel is input to the analog-to-digital converter.

12. The display device of claim 11, wherein, when the input change switch is turned off, the analog-to-digital converter converts the voltage of the sensing line to a BLVDS type digital signal and outputs the BLVDS type digital signal to the timing controller through the BLVDS line.

13. The display device of claim 1, wherein the display panel includes a plurality of sub-pixels, and the sensing line is connected to a sub-pixel from the plurality of sub-pixels to sense characteristic values of a driving transistor in the sub-pixel.

14. The display device of claim 13, wherein the sub-pixel includes an organic light emitting diode, a driving transistor configured to drive the organic light emitting diode, a first transistor electrically connected between a first node of the driving transistor and the data line, a second transistor electrically connected between a second node of the driving transistor and the sensing line, and a storage capacitor electrically connected between the first node and the second node of the driving transistor.

* * * * *